US012776500B2

(12) United States Patent
Hausmann

(10) Patent No.: US 12,776,500 B2
(45) Date of Patent: Oct. 27, 2026

(54) DEVICE FOR SUPPLYING AIR TO A FUEL CELL

(71) Applicant: CELLCENTRIC GMBH & CO. KG, Kirchheim/Teck-Nabern (DE)

(72) Inventor: Philipp Hausmann, Kirchheim unter Teck (DE)

(73) Assignee: CELLCENTRIC GMBH & CO. KG, Kirchheim Unter Teck (DE)

( * ) Notice: Subject to any disclaimer, the term of this patent is extended or adjusted under 35 U.S.C. 154(b) by 641 days.

(21) Appl. No.: 18/257,332

(22) PCT Filed: Dec. 17, 2021

(86) PCT No.: PCT/EP2021/086357
§ 371 (c)(1),
(2) Date: Jun. 14, 2023

(87) PCT Pub. No.: WO2022/129445
PCT Pub. Date: Jun. 23, 2022

(65) Prior Publication Data

US 2024/0014418 A1 Jan. 11, 2024

(30) Foreign Application Priority Data

Dec. 18, 2020 (DE) ..................... 10 2020 007 745.5

(51) Int. Cl.
*H01M 8/00* (2016.01)
*B05B 7/06* (2006.01)
(Continued)

(52) U.S. Cl.
CPC ......... *H01M 8/04141* (2013.01); *B05B 7/066* (2013.01); *B05B 7/12* (2013.01);
(Continued)

(58) Field of Classification Search
CPC ......... H01M 8/04141; H01M 8/04111; H01M 8/04007; B05B 7/12; B05B 7/066
See application file for complete search history.

(56) References Cited

U.S. PATENT DOCUMENTS

2017/0346111 A1 11/2017 Eschenbach et al.
2020/0373591 A1* 11/2020 Lucas ............... H01M 8/04074

FOREIGN PATENT DOCUMENTS

CN 110748690 A * 2/2020 ........... H01F 7/1607
DE 10223353 12/2003
(Continued)

OTHER PUBLICATIONS

Kato et al., Fuel Cell System Nov. 2007, See the Abstract. (Year: 2007).*

(Continued)

*Primary Examiner* — Tiffany Legette
*Assistant Examiner* — Monique M Wills
(74) *Attorney, Agent, or Firm* — Sheridan Ross P.C.

(57) ABSTRACT

The invention relates to a device for supplying air to a fuel cell, having at least one air conveying device and at least one humidifying device, which supplies condensed product water from the fuel cell to the compressed supply air flow by means of at least one nozzle. It is characterized in that a field of two-substance nozzles for the supply of water is formed in the flow cross section of the supply air flow, wherein a separated cross section through which flow can take place is formed for each of the two-substance nozzles and wherein each of the separated cross sections through which flow can take place comprises a valve having a valve seat and a valve body, which is pressed counter to the flow by a restoring force in the direction of the valve seat.

10 Claims, 1 Drawing Sheet

(51) Int. Cl.

| | |
|---|---|
| ***B05B 7/12*** | (2006.01) |
| ***B60L 50/72*** | (2019.01) |
| ***H01M 8/04007*** | (2016.01) |
| ***H01M 8/04111*** | (2016.01) |
| ***H01M 8/04119*** | (2016.01) |

(52) U.S. Cl.

CPC ......... *B60L 50/72* (2019.02); *H01M 8/04007* (2013.01); *H01M 8/04111* (2013.01); *H01M 2250/20* (2013.01)

(56) References Cited

FOREIGN PATENT DOCUMENTS

| | | | |
|---|---|---|---|
| DE | 102012011863 | | 3/2013 |
| DE | 102004038633 | | 7/2013 |
| DE | 102017214312 | | 2/2019 |
| DE | 102020206156 | | 11/2021 |
| JP | H05-054900 | | 3/1993 |
| JP | 2001-283887 | | 10/2001 |
| JP | 2005-032696 | | 2/2005 |
| JP | 2007-103333 | | 4/2007 |
| JP | 2007-294442 | | 11/2007 |
| JP | 2007294442 A | * | 11/2007 |
| JP | 4502468 B2 | * | 7/2010 |
| JP | 2022-535953 | | 8/2022 |

OTHER PUBLICATIONS

Fuel cell power generator, Jul. 2010, See the Abstract. (Year: 2010).*

Inger Valve with energy-saving electric actuator, Feb. 2020, See the Abstract. (Year: 2020).*

International Search Report and Written Opinion for International (PCT) Patent Application No. PCT/EP2021/086357, dated Jun. 3, 2022, 10 pages.

English Translation of the International Search Report for International (PCT) Patent Application No. PCT/EP2021/086357, dated Jun. 3, 2022, 2 pages.

Official Action with Machine Translation for Japan Patent Application No. 2023-534106, dated Jun. 18, 2024, 4 pages.

* cited by examiner

DEVICE FOR SUPPLYING AIR TO A FUEL CELL

CROSS REFERENCE TO RELATED APPLICATIONS

This application is a national stage application under 35 U.S.C. 371 and claims the benefit of PCT Application No. PCT/EP2021/086357 having an international filing date of 17 Dec. 2021, which designated the United States, and which PCT application claimed the benefit of German Patent Application No. 10 2020 007 745.5 filed 18 Dec. 2020, the contents of each of which are incorporated herein by reference in their entireties.

The invention relates to a device for supplying air to a fuel cell according to the type defined in more detail in the preamble of claim 1. It also relates to a fuel cell system having such a device.

Air is typically supplied to fuel cells via an air conveying device, for example a turbomachine, which is driven by an electric motor and, if necessary, can also be driven in a supporting manner by an exhaust air turbine. This structure is generally known by the term electric turbocharger or ETC or motor-assisted turbocharger. It is the case here that after the compression, the supply air to the fuel cell is heated accordingly. In the case of a low-temperature fuel cell, in particular a PEM fuel cell, this is a serious disadvantage and an intercooler is provided in many conventional structures. This cools the air down before it flows through a humidifier and is appropriately humidified for use in the fuel cell. This structure is large, complex, and causes pressure losses in the supply air flow. In particular, an intercooler has the disadvantage that it puts an additional load on the cooling circuit of the fuel cell system. Since the removal of the waste heat from the fuel cell system is difficult in any case at the relatively low temperature level of this waste heat of usually below 100 to 120° C., the additional heat input due to the intercooler represents a considerable disadvantage.

DE 10 2004 038 633 B4 now proposes implementing the humidification of the air by introducing the condensate of the fuel cell system into the heat exchanger used as an intercooler via injectors. As a result, on the one hand product water from the fuel cell is consumed and on the other hand a humidifier, for example a membrane humidifier, which is designed as a gas/gas humidifier, can be dispensed with. However, the load on the cooling circuit remains here.

DE 10 2017 214 312 A1 humidifies the supply air flow to a fuel cell by means of water which condenses from the fuel cell system and is injected via an injection valve into the volume flow after the compressor. Humidification is achieved in this way, and a conventional humidifier can be dispensed with. The subject of intercooling plays no role here and is not mentioned.

The object of the present invention now consists of specifying an improved device for supplying air to a fuel cell according to the type defined in more detail in the preamble of claim 1.

According to the invention, this object is achieved by a device having the features in claim 1, and here in particular in the characterizing part of claim 1. Advantageous designs and refinements of the device result from the claims dependent thereon. Claim 10 also specifies a fuel cell system having such a device.

Similarly to the prior art, the device according to the invention uses a nozzle for humidifying the supply air flow. It is the case here that, according to the invention, a field of two-substance nozzles for the supply of the water that has condensed out is formed in the cross section of the supply air flow. For each of the two-substance nozzles, a separated cross section through which flow can take place is available, so that each nozzle is flowed at by its airflow in a targeted manner. This makes it easy and very efficient to design the two-substance nozzle appropriately for the volume flow of air that it is supposed to humidify. Each of the separated cross sections through which flow can take place comprises a valve seat and a valve body, which experiences a restoring force in the direction of the valve seat counter to the flow, for example by a spring or another restoring element.

According to an extraordinarily favorable refinement of the device according to the invention, the individual restoring forces can be specified individually for each individual one of the separated cross sections through which flow can take place, so that depending on the pressure and volume flow that the air conveying device builds up, only one or the other or a targeted number of valve bodies is lifted from the valve seats in order to flow through the respective two-component nozzle and to atomize the water supplied thereto. If all valve bodies are lifted from their valve seats in all separated cross sections through which flow can take place, a corresponding cross section has to be available which is designed for the maximum air volume flow and in which all two-substance nozzles in the field of two-substance nozzles are supplied with water and humidify the volume flow.

It has been shown that the humidification of the hot volume flow downstream of the flow compressor, which can have temperatures in the order of magnitude of 150 to 250° C., for example, is ideal. The supplied water, which according to an advantageous refinement of the concept can be preheated via a heat exchanger, in particular by waste heat from the fuel cell system, can then ideally be evaporated in the volume flow. This ensures, on the one hand, that the supply air flow is humidified and, on the other hand, it is cooled down after the air conveying device. Depending on the supply air flow required, suitable humidification can be ensured due to the number, that is matched to this volume flow, of separated cross sections through which flow can take place and through which flow does take place. An ideal adaptation can thus be achieved. In particular, a device for supplying air designed in this way can then dispense with both the intercooler and the humidifier, so that the pressure losses occurring in the supply air flow are efficiently reduced. In addition, the components and the installation space required for the components can be saved, so that this also ensures further advantages.

In the embodiment variant already described above, in which the water that has condensed out is correspondingly preheated, namely by waste heat from the fuel cell system itself, the design also enables the load on the cooling circuit of the fuel cell to be relieved. This is not only relieved by the possibility of doing without the intercooler, but additionally by using heat from the cooling circuit of the fuel cell to preheat the water that has condensed out before atomization. This helps massively to further optimize the constellation of the cooling circuit in low-temperature fuel cells, which is already critical with regard to the dissipation of waste heat.

Another decisive advantage of the structure is also the use of the valve bodies and valve seats, which are opened as required by the volume flow conveyed by the air conveying device. If this volume flow falls below a certain limiting value or does not occur at all, the valve bodies are pressed or pulled onto the valve seats and the structure is sealed. An additional utilization of the device according to the invention as a passive cathode shut-off valve thus results, which efficiently prevents air from flowing through the fuel cell whenever the air conveying device is not in operation and accordingly no flow of air is desired.

Conventional valves of this type that open automatically under pressure can operate, for example, via a spring. This has the disadvantage that increasing volume flow and increasing opening cross section between the valve seat and the valve body are also accompanied by an increasing restoring force of the spring. This can result in the valve body oscillating and thus an uneven flow, which can be disadvantageous for the downstream components and/or metering accuracy due to occurring pressure fluctuations. According to an extraordinarily favorable refinement of the device according to the invention, a magnetic force is therefore used as the restoring force. This then acts between a switchable and/or permanent magnet, for example in the area of the valve body but preferably in the area of the valve seat and a magnetizable material such as a steel or iron alloy in the area of the valve seat or preferably in the area of the valve body. The valve body is therefore designed, for example, in the form of a hollow iron or steel ball, preferably having a chemically resistant coating, for example made of plastic. It is then held on the valve seat by permanent magnets and/or electromagnets. With increasing volume flow, the valve body, which has a low mass due to the design as a hollow sphere and reacts dynamically accordingly, lifts off from the valve seat and releases a cross section through which flow can take place. As the volume flow increases, this cross section through which flow can take place becomes larger. In contrast to a spring-loaded ball, with a magnetic restoring force, the restoring force also decreases with the distance between the valve body and the valve seat, so that a degressive force-displacement characteristic curve of the respective valve results, which is ideal for the above-mentioned possible applications, on the one hand, of controlling the supply air flow to the respective two-substance nozzle and, on the other hand, as a cathode shut-off valve.

A further very favorable embodiment of the device according to the invention can also provide that the water can be conveyed via a conveying device directly or via a collecting line to the two-substance nozzles. Depending on the delivery pressure and the delivered volume flow, the amount of water for humidification can be adjusted. In particular, the use of a collecting line thereby also enables the water to be used in other areas of a system surrounding the device, in particular a fuel cell system surrounding the device. Such a use of the water with a water collecting line is described in detail, for example, in DE 10 2020 206 156 A1 of the applicant.

The collected water can and should pass through appropriate purification devices and filters, for example to mechanically hold back impurities and to remove ions which have collected in the water. For example, a combination of a water filter with an ion exchanger cartridge can be provided and can be arranged, for example, in the area of the collecting line or between the individual water separators of such a system and a collecting container which is preferably heated and in particular comprises the above-mentioned heat exchanger.

According to a very advantageous refinement of the concept, the individual separated cross sections through which flow can take place, with the respective two-substance nozzles and the valves, can thereby be arranged directly at the outlet of a flow compressor as an air conveying device. In this context, direct means that no further components are interposed. In particular, the device according to the invention can be designed in such a way that the separated cross sections with their valves and two-substance nozzles are flanged directly on the outlet of the flow compressor in order to then introduce the supply air cooled and humidified by them directly or via a short line into the cathode space of the fuel cell. In this area immediately after the outlet of the flow compressor, the highest temperature of the supply air is present, so that the evaporation of the preheated water can take place ideally, on the one hand to humidify this supply air and on the other hand to cool it to a temperature level suitable for the fuel cell.

According to an extraordinarily favorable refinement of the device, it can be provided that at least two air conveying devices and/or humidifying devices are provided as a sequential cascade. Two such successive humidifier nozzles and/or charging stages can then be used for register charging, which is known per se. This enables greater variability of the structure and allows different material flows to be humidified efficiently.

The respective air conveying device can be part of an electrically assisted turbocharger with the air conveying device, an exhaust air turbine, and an electric machine. Such a structure, which is also generally known under the term ETC (electric turbocharger) or motor-assisted turbocharger, is ideally suitable for efficiently implementing the air supply of the fuel cell. In addition to the drive power typically required from the electric machine, energy recovered from the exhaust air can also be used for compression via the turbine. If there is more energy in the area of the turbine than is required for driving the air conveying device, then the electrical machine can also be operated as a generator in order to recover this energy in the form of electrical energy and store it temporarily. This applies to the use of two as well as one air conveying device.

The entire structure of the device can be integrated into a fuel cell system having a fuel cell, in particular a stack of individual cells, a so-called fuel cell stack. The fuel cell system itself can be used for various stationary or mobile applications. In particular, it can be used to provide electrical drive energy for a vehicle. In particular in such vehicle applications, it is advantageous on the one hand to reuse the collected product water so that it does not have to be drained onto the street, and on the other hand the decisive advantages with respect to the structural volume, the weight, the energy efficiency, and the saving of components due to the device according to the invention are a particularly significant advantage here.

Further advantageous embodiments of the device according to the invention also result from the exemplary embodiment which is described in more detail hereinafter with reference to the figures.

Figure 1:
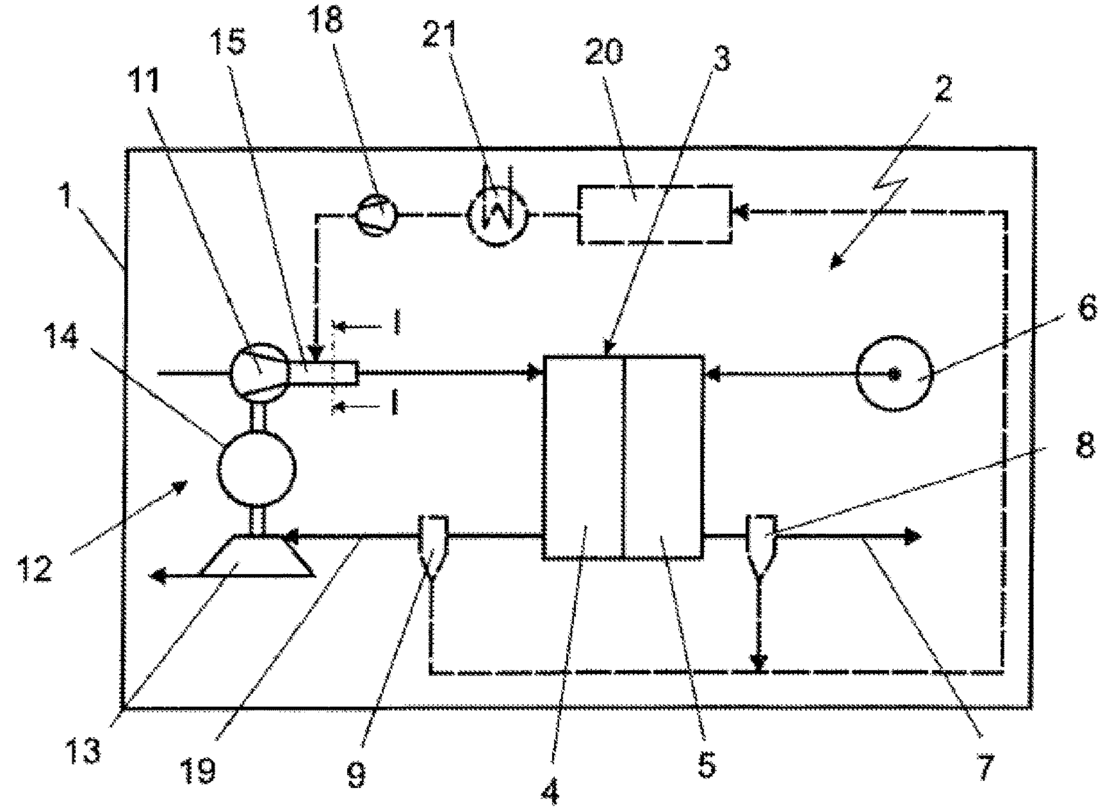
FIG. 1 shows a schematically indicated fuel cell system in a vehicle having a device according to the invention.

In the representation of FIG. 1, a very schematically indicated vehicle 1, for example a utility vehicle or a passenger vehicle, can be seen. At least part of its electrical drive power is supplied to this vehicle 1 by a fuel cell system 2, which is indicated here only in parts and in a very simplified manner. This comprises a fuel cell 3 as its core, which is constructed, for example, as a stack of individual cells in PEM technology, as a so-called fuel cell stack. A common cathode chamber 4 and a common anode chamber 5 are indicated here solely by way of example. Hydrogen from a hydrogen storage system 6 is supplied to the anode chamber 5, residual hydrogen leaves the system via an exhaust gas line 7 having a water separator 8. Further variants of the anode side are of course possible. Since these are of secondary importance for the present invention, they will not be discussed further. However, it is clear to a person skilled in the art that different storage systems for the hydrogen, different metering devices, and an anode circuit having one or more recirculation conveying devices and the like are conceivable and possible here.

Air is supplied to the cathode chamber 4 as an oxygen supplier via a device 10 for supplying air. Part of this device 10 is an air conveying device 11, which can be designed, for example, as part of a so-called electric turbocharger 12. This electric turbocharger 12, which is known per se, comprises an exhaust air turbine 13 and an electric machine 14 in addition to the air conveying device 11, which is preferably designed as a flow compressor. Its mode of operation is known in principle, so that it does not have to be discussed further here.

Figure 2:
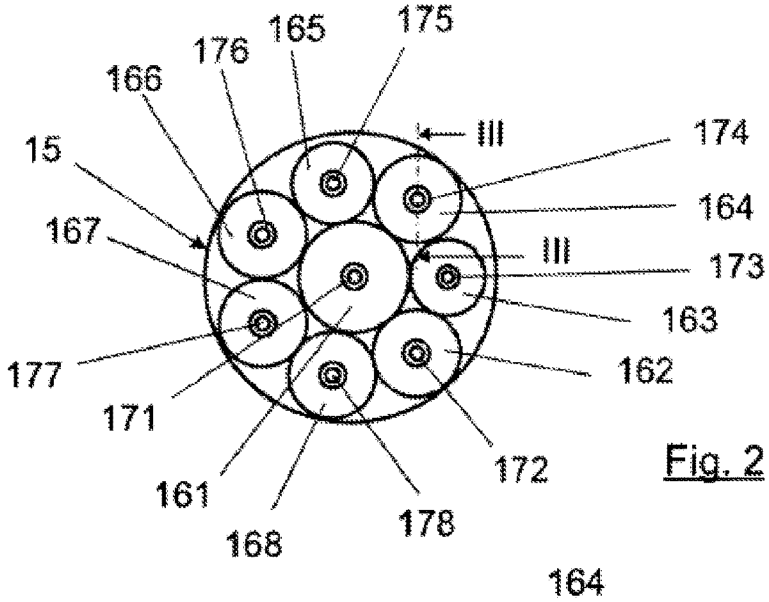
FIG. 2 shows a sectional view through part of the device according to line II-II in FIG. 1.

After the air conveying device 11 there is a hot and dry compressed supply air flow to the cathode chamber 4 of the fuel cell 3. This now arrives, preferably directly after the air conveying device 11, in a field of individual cross sections through which flow can take place, each having a two-substance nozzle. In the schematic cross section of FIG. 2, this field, designated by 15 in FIG. 1, is indicated again. The individual cross sections through which a flow can take place are designated here by the reference signs 161-168. For example, they can be round and arranged within the flow cross section of the supply air. In the center of each individual separated cross section 161-168 through which flow can take place a two-substance nozzle 171-178 is located, through which, on the one hand, the volume flow, that flows through the cross section 161-168 through which flow can take place, of the air that is hot and dry after the air conveying device 11 flows and which, on the one hand, and is supplied with water via a conveying device 18, as can be seen in the representation of FIG. 1. This water is thereby deionized water, which is condensed out and collected in the fuel cell system 2. Two water separators are indicated purely by way of example in the illustration in FIG. 1. On the one hand, this is the above-mentioned water separator 8 on the anode side, and on the other hand, in an exhaust air line 19 connecting the cathode chamber 4 to the exhaust air turbine 13, this is a cathode-side water separator, designated by 9 here. The product water collected in this way reaches, for example, a tank indicated here as an example and designated by 20 and is preheated therein or in the flow direction downstream thereof via a heat exchanger 21 and then reaches the area of the conveying pump 18, to thus be supplied to the respective two-substance nozzles 171-178 depending on the generated conveying pressure and the generated volume flow. This can, for example, take place directly for each of the two-substance nozzles 171-178 and, if necessary, in a switchable manner via a valve, or via a collecting line, from which a flow takes place against the corresponding two-substance nozzles.

This structure of the device 10 could also be varied in that two or possibly more of the air conveying devices are connected in series as a sequential cascade. These would then each be followed by a corresponding two-substance nozzle 171-178 to humidify the corresponding airflow and provide the other functionalities described herein.

Figure 3:
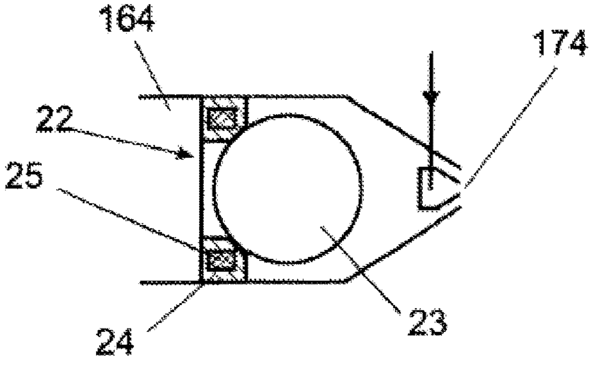
FIG. 3 shows a schematic sectional view according to line III-III in FIG. 2.

In the representation of FIG. 3, one of the separated cross sections through which flow can take place is now shown again in a sectional representation, here for example the cross section 164. It comprises the two-substance nozzle 174 and a valve 22 consisting of a valve body 23 and a valve seat 24. The valve body 23 can preferably be designed as a hollow steel ball having a plastic casing. In the area of the valve seat 24 there is a permanent magnet 25 which is designed, for example, as a circumferential ring. This exerts an attractive force on the valve body 23, so that when there is little or no volume flow via the valve 22, the respective cross section 161-168 through which flow can take place is closed. This is the case in particular when the air conveying device 11 is not in operation. This prevents air from flowing through the cathode space 4, for example travel wind during purely electric operation of the vehicle 1, or when the vehicle is switched off, due to external wind effects. This is of decisive advantage in order to prevent fresh oxygen from penetrating into the fuel cell 3, which would result in what is known as an air/air start and damage the fuel cell 3 in the event of a later restart.

It is now the case that as the volume flow from the air conveying device 11 increases, first one and then several of the valves 22 in the respective cross sections 161-168 through which flow can take place open accordingly. In particular, the restoring forces can be set in such a way that a suitable number of the cross sections 161 168 through which flow can take place are opened by their valves 22 to match the respective volume flow from the air conveying device 11, for example first the central cross section 161 through which flow can take place and then increasingly the cross sections 161 168 through which flow can take place arranged centrally around it, until at the maximum volume flow from the air conveying device 11, all cross sections 161 168 through which flow can take place are opened by their respective valves 22. As soon as the respective cross section 161 168 through which flow can take place is opened via the valve 22, air flows through it. If water is supplied at the same time, then this is atomized accordingly via the two-substance nozzle 171 178 in the hot and dry air flow downstream of the air conveying device 11, so that the water particles atomized into fine droplets can evaporate in the volume flow. This results in very efficient cooling of the supply air flow on the one hand and very good humidification of the supply air flow on the other hand. The two-substance nozzles 171 178 can thereby be designed in such a way that they are adapted to the respective volume flow, so that there is always ideal atomization of the water and thus ideal humidification and cooling. This applies at every volume flow of the supplied air, since only the number of cross sections through which flow can take place that matches the respective volume flow is ever passively released by the valves 22. At the same time, the valves 22 all together shut off the cathode chamber 4 from the environment when the air conveying device is switched off.

This results in a fine, stepped characteristic curve, which allows appropriate regulation on the one hand via the delivery pressure and the volume flow of the air conveying device 11 and via the delivery pressure and the volume flow of the conveying pump 18, in order to use water preheated in the hot compressed air from the fuel cell system 1 to humidify the supply air flow. The preheating can take place in particular in the heat exchanger 21 by waste heat from the fuel cell 3 itself, so that this additional use of waste heat relieves the cooling system of the fuel cell system 2 and thus the vehicle 1.

The invention claimed is:

1. A device for supplying air to a fuel cell, having at least one air conveying device and at least one humidifying device, which is configured to supply condensed product water from the fuel cell to the compressed supply air flow by means of at least one nozzle, wherein a field of two-substance nozzles for the supply of water is formed in the flow cross section of the supply air flow, wherein a separated cross section through which flow can take place is formed for each of the two-substance nozzles, and wherein each of the separated cross sections through which flow can take place comprises a valve having a valve seat and a valve body, which is pressed counter to the flow by a restoring force in the direction of the valve seat, wherein the valve is configured to be passively actuated by the supply air flow.

2. The device as claimed in claim 1, wherein the restoring force is formed as a magnetic force between a switchable and/or permanent magnet in the area of the valve body and a magnetizable material of the valve seat.

3. The device as claimed in claim 2, wherein the valve body is designed as a hollow sphere made of a magnetizable material.

4. The device as claimed in claim 1, wherein the restoring force for each of the separated cross sections through which flow can take place is predetermined, wherein at least two of the separated cross sections through which flow can take place have different specifications and/or cross sectional areas.

5. The device as claimed in claim 1, wherein the water can be conveyed via a conveying pump directly or via a collecting line to the two-substance nozzles.

6. The device as claimed in claim 1, wherein the water flows upstream of the two-component nozzles through a heat exchanger.

7. The device as claimed in claim 1, wherein the separated cross sections through which flow can take place are arranged directly in the outlet of a flow compressor used as an air conveying device.

8. The device as claimed in claim 1, wherein at least two air conveying devices and/or humidifying devices are provided as a sequential cascade.

9. The device as claimed in claim 1, wherein the supply air flow is free of an intercooler and a membrane humidifier.

10. A fuel cell system having a fuel cell and a device as claimed in claim 1, in particular for supplying a vehicle with at least part of its electrical drive power.

* * * * *